Nov. 30, 1937.　　P. M. GILFILLAN　　2,100,739
CONTAINER MACHINE
Filed March 20, 1936　　5 Sheets-Sheet 3
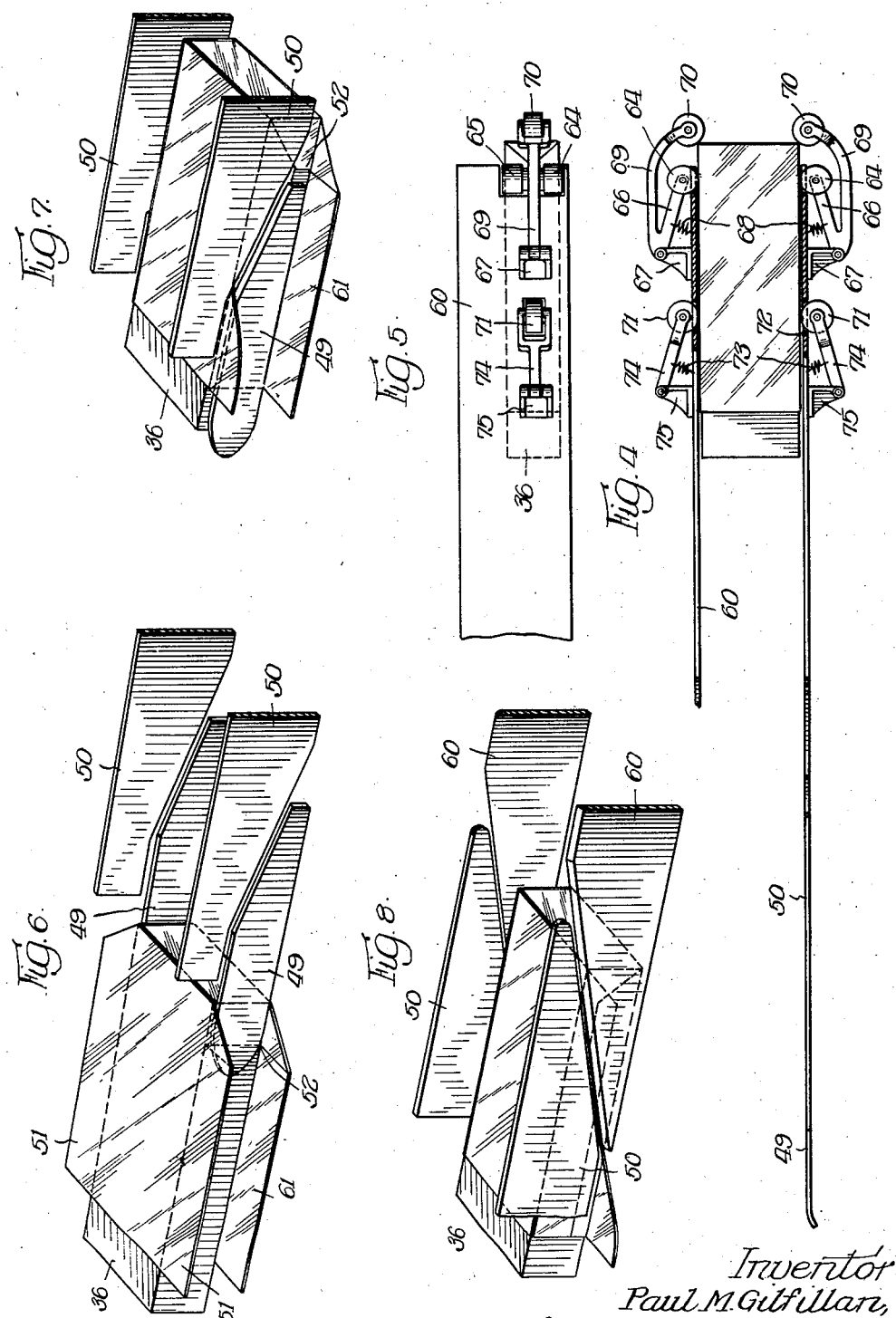
Inventor:
Paul M. Gilfillan,
By Cromwell, Freist & Warden
Attys.

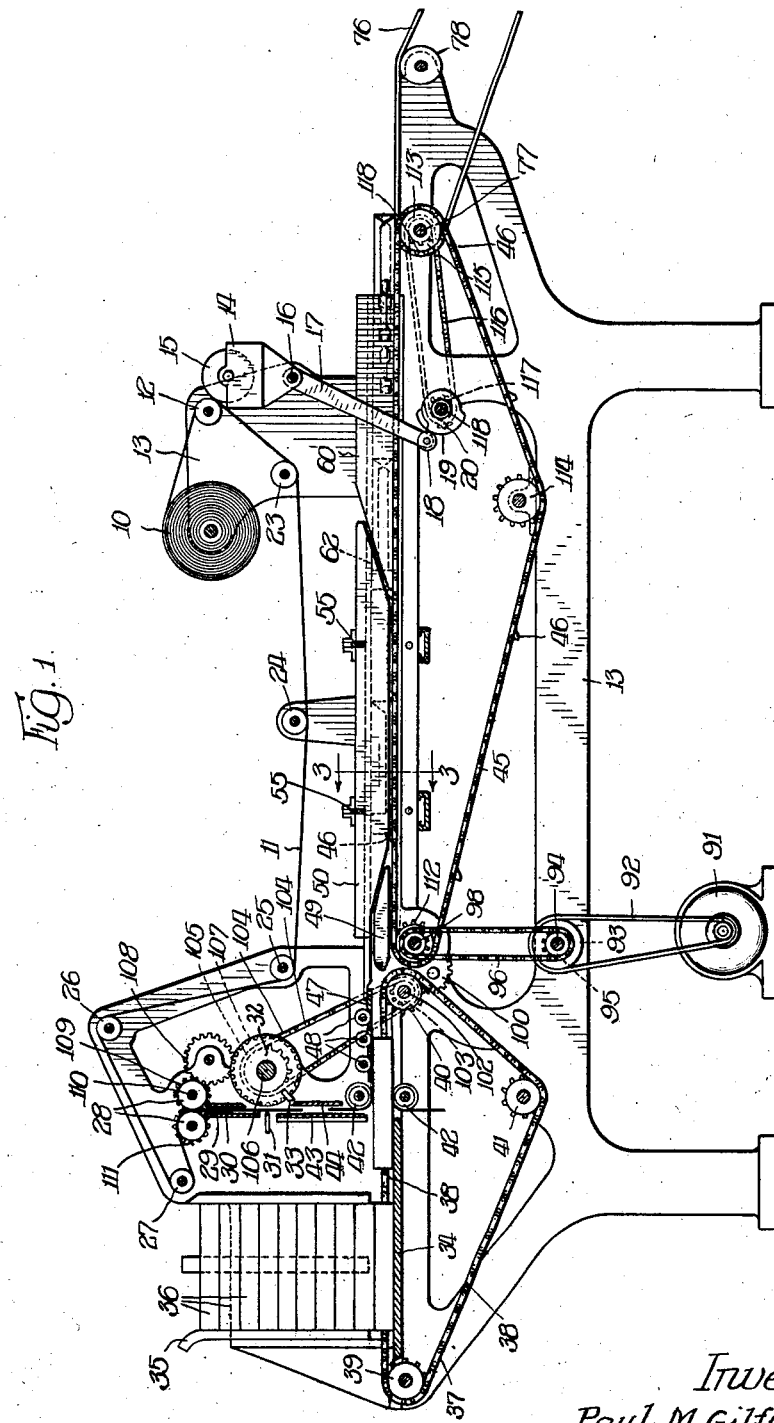

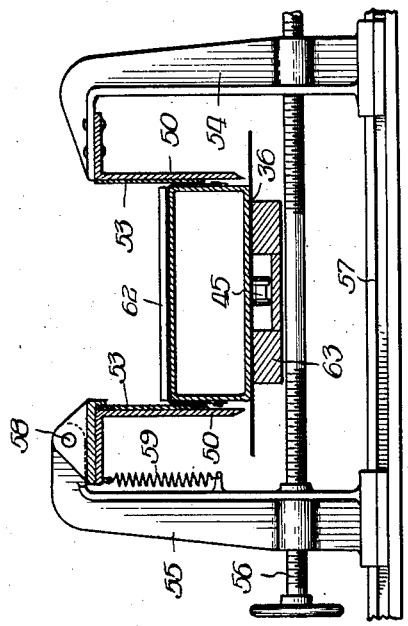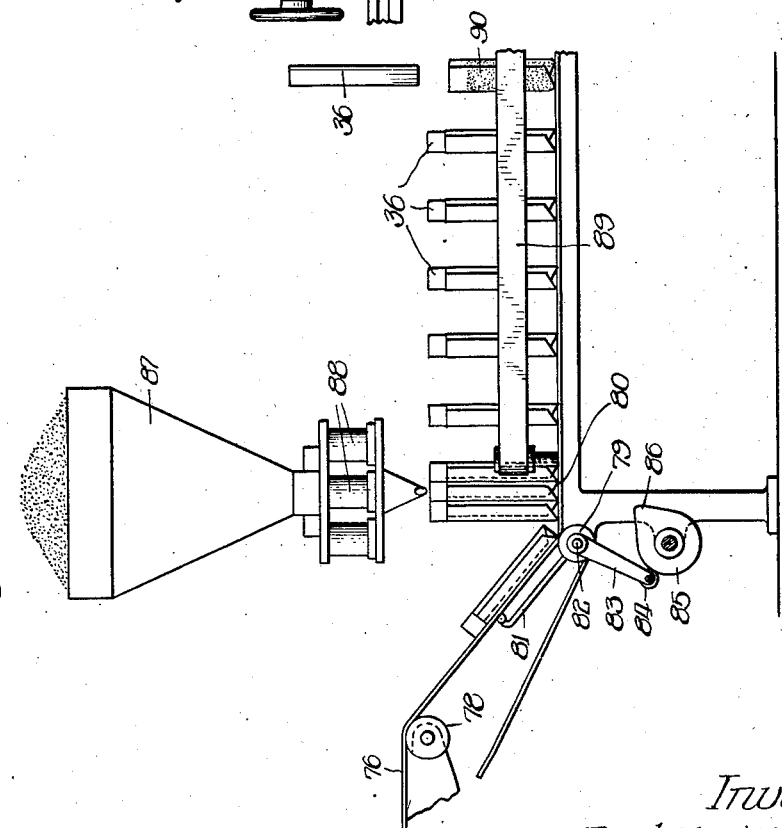

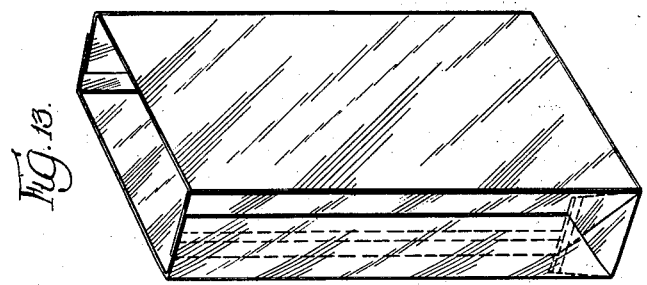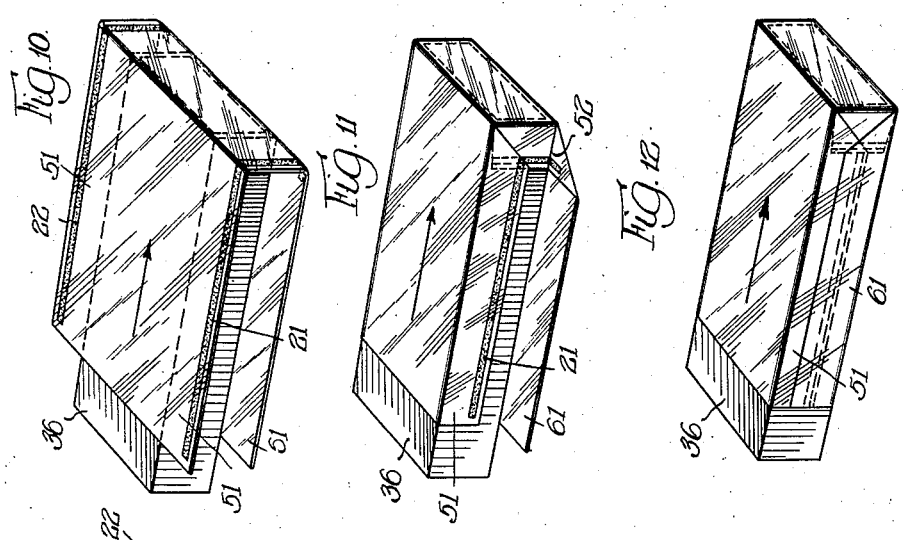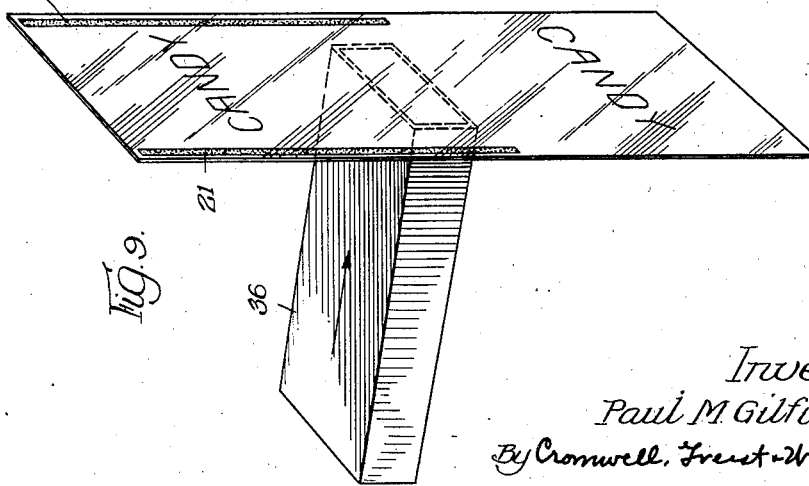

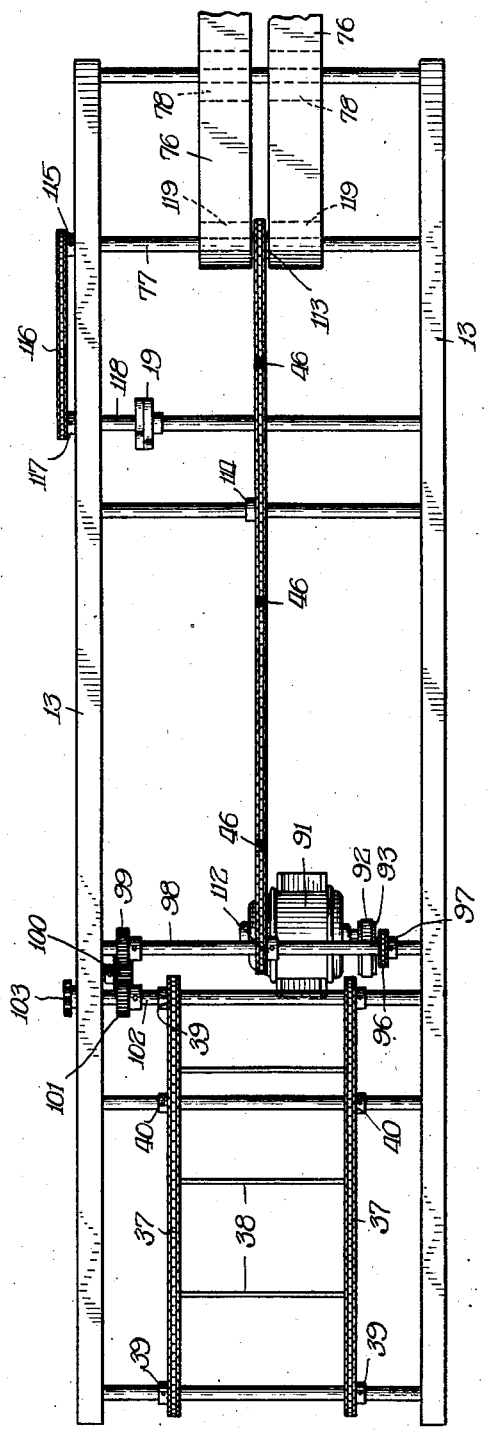

Patented Nov. 30, 1937

2,100,739

UNITED STATES PATENT OFFICE 2,100,739

CONTAINER MACHINE

Paul M. Gilfillan, Chicago, Ill., assignor to Shellmar Products Company, Mount Vernon, Ohio, a corporation of Delaware Application March 20, 1936, Serial No. 69,801

8 Claims. (Cl. 93—51.1)

The present invention relates to containers of the bag type, and has particular reference to an improved machine and method of forming containers of the type customarily constructed of materials such as transparent cellulose sheeting. Containers of this type are described in my copending application Serial No. 69,801, filed February 27, 1936, and are used for such purposes as packaging food products.

The principal object of the invention is to provide an improved machine for forming open ended containers of the type described.

An additional object of the invention is the provision of a machine which will apply a series of spaced lines of thermoplastic adhesive to a web of material and then form from such a web as a continuous operation, open ended containers adapted to receive goods to be packaged.

A further object is to provide a machine and method for forming open ended containers about the hollow mandrel, the containers having continuous front, rear and bottom walls and side sections secured together in overlapped relation and sealed by a line of thermoplastic adhesive.

These and other objects will be evident upon a consideration of the following description of a preferred embodiment of the invention and by reference to the accompanying drawings, in which Fig. 1 is a side view, partly diagrammatic, of a machine constructed in accordance with the invention;

Fig. 2 is a side view of an extension of the machine shown in Fig. 1, this extension being adapted for the filling of the containers constructed by the machine;

Fig. 3 is a cross-sectional view taken along line 3—3 of Fig. 1 and showing the details of construction of the forming mechanism for the container;

Fig. 4 is a top view of the formers and sealing unit;

Fig. 5 is a side view of the unit shown in Fig. 4;

Fig. 6 is a perspective view showing an initial stage in the formation of the container around the hollow mandrel;

Fig. 7 is a perspective view showing a second operation in the formation of the container about the mandrel;

Fig. 8 is a perspective view showing the third stage in the formation of the container about the hollow mandrel;

Fig. 9 is a perspective view showing a container blank about to be engaged by the hollow mandrel;

Fig. 10 shows the blank with front, bottom and rear walls folded about the hollow mandrel;

Fig. 11 is a perspective view showing the completion of the operation disclosed in Fig. 7, with the thermoplastic adhesive line apparent;

Fig. 12 is a view showing the operation of Fig. 8 completed;

Fig. 13 shows the finished container with the hollow mandrel removed; and

Fig. 14 is a top view showing the driving mechanism for the machine.

It has been customary heretofore to wrap cigarette packages and the like in materials such as transparent cellulose sheeting having thin coatings of wax thereon for moisture proofing purposes by projecting the end of the package against the center of a blank of the material and folding the blank about the package with its edges in overlapped relation, the continuous coatings of wax on both sides of the blank being melted under heat and pressure where the materials are overlapped to complete the closure. Such containers are not satisfactory as substitutes for bags in which the commodity to be packaged is directly loaded into the container. Particularly is this true where the material to be packaged is to be protected from an increase or decrease in moisture or from "sifting."

As shown in Fig. 1 the container of the present invention is formed from a roll 10 of transparent cellulose sheeting such as regenerated cellulose or cellulose acetate. A web 11 is taken from the roll and passed over an idler roller 12, both the roll and the idler being supported on the frame 13 in a well known manner. Adjacent the roller 12 is mounted an adhesive pot 14 adapted to maintain in solution a thermoplastic adhesive. Preferably, the thermoplastic adhesive is maintained in liquid condition by being melted. A quick drying solvent may be employed to assist in keeping the adhesive liquid before application. An electric heating coil or other suitable means may be employed for treating the adhesive pot. The pot 14 carries two adhesive wheels 15, and is rigidly mounted on shaft 16 extending in a rotatable manner between adjacent sides of the frame structure 13. Shaft 16 also carries an arm 17 having on its opposite end a roller 18 which engages a cam wheel 19.

As shown in the drawings the cam 19 is of the split type in which by regulation of the clamping bolt 20 the arc of the raised portion of the cam can be changed as desired. When the roller 18 is riding upon the raised portion of the cam 19 the thermoplastic adhesive-applying wheels 15 are out of engagement with the web 11. As the cam wheel rotates the roller 18 passes on to the portion of the cam having a smaller diameter, and the drop of arm 17 causes the wheels 15 to contact the web 11 and to apply lines of thermoplastic adhesive thereto. Upon further rotation of the cam 19 the roller 18 again rides upon the raised portion of the cam and the wheels 15 are moved out of contact with the web 11. It will be seen that by proper adjustment of the cam 19 restricted lines of thermoplastic adhesive may be applied at intervals and for any desired distance along the web 11.

These lines of adhesive are applied substantially as shown at 21 and 22 in Fig. 9. That is, the lines of adhesive are applied adjacent but spaced from the edges of the web. The wheel for applying adhesive line 22 along the opposite edge of the web from line 21 is the same as and is spaced from the wheel shown in Fig. 1, both wheels being rotatably mounted in the pot 14. After the web passes about the roller 12 and receives its marginal lines of thermoplastic adhesive, it passes downwardly beneath an idler 23 and then travels horizontally beneath idlers 24 and 25. From idler 25 the web 11 passes upwardly and over the top of an idler 26. Thereafter the web passes about another idler 27 and then into draw rolls 28 of a cutting unit. A thermoplastic adhesive is employed which will become substantially set up before it reaches the draw rolls 28. As the web passes beneath rollers 23, 24, and 25, there is no contact with the freshly applied lines of adhesive, and it is preferred that rollers 26 and 27 which contact the web on the same side as the adhesive lines 21 and 22 be of such a width as to engage the central portion only of the web. That is, the rollers 26 and 27 are sufficiently short that their ends do not reach outwardly as far as the adhesive lines 21 and 22, thereby giving the adhesive further hardening or setting time prior to contact with the structure of the machine. If desired, draw rolls 28 likewise may be of a similar width.

After passing through draw rolls 28 the web is directed downwardly between plates 29 and 30 of the cutting unit. These plates direct the web adjacent the fixed cutting knife 31 which cooperates with a rotatable cutting roll 32 carrying knife 33. The knife 33 severs the web into a series of blanks of the shape shown in Fig. 9. Below the cutting unit the end of the web hangs loosely prior to being cut into blanks and the distance the web hangs down prior to the cutting operation depends upon the size of the container to be formed.

Adjacent the end of the machine a platform 34 is provided and upon this platform is mounted a hopper 35 carrying a stack of hollow open-ended mandrels 36, these mandrels being substantially of the shape shown in Fig. 9. A delivery unit is provided adjacent the hopper 35 for moving the mandrels 36 therefrom one at a time. This delivery unit consists of two chains 37 having rods 38 extending therebetween, the chains being mounted so that the rods 38 engage the after end of the bottom mandrel in the hopper in the manner shown in Fig. 1. The chains travel about sprockets 39 and 40 located along the path of travel of the mandrels and a lower sprocket 41.

The pins 38 are located at spaced points along the chains so that the hollow mandrels 36 are delivered from the hopper at spaced intervals. The mandrels are driven by the pins 38 at a speed faster than the speed of the web 11, and the pins are so positioned on the chains as to engage with the end of the web in the manner shown in Fig. 9 prior to the cutting operation. That is, the forward end of the mandrel is pushed against the central portion of the web which hangs down below the cutting knife and this frictional engagement prevents the blank from falling out of place after the cutting operation. The blank is wrapped about the end of the mandrel as shown in Fig. 1 and is pressed in frictional engagement with the mandrel by the rollers 42 between which the mandrel is pushed by the rods 38. The rollers 42 preferably are rubber and are in contact with the mandrels so that the web is firmly engaged thereabout. The knife 33 passes in contact with stationary knife 31 and severs a container blank from the end of the web, the cutting operation being adjacent the ends of glue lines 21 and 22. To insure that the end of the web will pass downwardly in position for engagement with the mandrels, lower plates 43 and 44 are provided below the cutting knife 31.

The rods 38 drive the mandrels with the container blank folded thereabout in the manner shown in Fig. 10 to a point adjacent a second conveyor system including a central chain 45 having a series of spaced dogs 46 for engaging the following end of the mandrels through an opening in platform 34 after the mandrels have been progressed as far as possible by pins 38. The mandrels pass between the platform 34 and a plate 47 after the engagement of the mandrel with the container blank, the plate 47 having a central slot through which extends a series of rubber rollers 48. These rollers are in frictional engagement with the container blank so as to maintain the latter tightly wrapped about the mandrel.

After engagement of the hollow mandrel with the container blank, the mandrel is carried by the conveyor systems through a series of formers which fold the side sections of the container blank about the mandrel.

The first stage of the folding operation is performed by initial formers 49 which are of slightly less width than the width of the mandrels and have outwardly curved ends for initially contacting bottom extensions of the container blank. The formers 49 constitute a path of substantially the same width as the width of the mandrel and act to fold the extensions of the bottom sections upwardly adjacent the sides of the mandrel a distance equal to more than half the thickness of the mandrels.

The mandrels engage the blanks so that the adhesive lines 21 and 22 are on the outside of the blank and extending along the extensions of the front wall and the bottom section, with a slight additional distance being provided to insure a sift-proof final seal. As shown in Fig. 10 the glue lines 21 and 22 extend across this end extension of the bottom and the former folds these sections with the thermoplastic adhesive line on the outside of the folded-over portion. In so operating, the former comes in contact with the line of thermoplastic adhesive, but as the latter is substantially set up there is little tendency toward gumming of the former.

After the initial formers 49 have folded the extensions of the bottom member inwardly adjacent the sides of the hollow mandrel, the extensions of the front wall of the blank along the top side of the mandrel pass between the formers 49 and a second set of formers 50. Formers 49 taper downwardly as do formers 50, thereby producing a channel which progressively folds the front wall extensions downwardly adjacent the sides of the hollow mandrel, as shown in Fig. 7. In this position the front wall extensions 51 overlap the extensions 52 of the bottom, and the adhesive lines face outwardly.

The lines of thermoplastic adhesive on extensions 51 appear on the outside thereof as these extensions are folded over by the formers 50, so that the line of adhesive is adjacent the formers 50. To reduce any dragging tendency by the lines of thermoplastic adhesive, the formers 50 are provided with inner plates 53 which extend downwardly to a point just above the lines of adhesive, thereby maintaining the adhesive in spaced relation with respect to the formers 50.

To provide for adjustment, the former units are supported on frames 54 and 55 and the latter are made adjustable with respect to the former by means of a hand-operated adjustment screw 56 extending therebetween. The frames 54 and 55 may be moved relative to each other along the track 57 to adjust the position between the formers. Additionally, the former 50 which is mounted on frame 55 has a pivotal connection 58 and normally is held in inward position by spring 59. This mechanism provides for yielding action which reduces the tendency of the blank to tear or jam.

The opposite end of formers 50 taper upwardly and these tapered portions are positioned adjacent similar tapered portions of a third set of formers 60. The coaction of these tapered portions results in the rear wall extensions 61 of the blank being folded upwardly in overlapped relation with respect to front wall extensions 51 in the manner shown in Fig. 8, thereby completing the folding of the blank about the hollow mandrel.

To insure a tight fold of the blank about the mandrel as the latter is progressed through the folding units, there is provided an upper plate 62 fitting over the top of the mandrel and a lower frame section 63 along which the mandrel slides. The frame section 63 is of the same height as platform 34 and has a central slot through which the chain 45 and the dogs 46 travel to drive the mandrels.

Adjacent the end of formers 60 are provided complementary heat and pressure applying units which include sets of forward electrically heated rollers 64 and 65 rotatably mounted on swing arms 66. The latter are pivotally mounted to the frame units 67. Springs 68 connected between the formers and swing arms 66 bias the latter toward inward position. The rollers 64 and 65 of each of the sets of these heating units are spaced apart as shown in Fig. 5 to contact the lower and upper parts of the transverse line of adhesive along the sections 52. A second arm 69 is attached to each of the arms 66 and the ends of arms 69 carry idler rollers 70 which extend inwardly a short distance further than the rollers 64 and 65. As the mandrels 36 are carried past the rollers 64 and 65 the latter apply heat and pressure to the adhesive line along sections 52 and seal the same. After the seals are effected the forward end of the mandrel strikes the rollers 70, as shown in Fig. 4, and the latter are caused to move outwardly, thereby lifting the heated rollers 64 and 65 out of contact with the material of the container.

On each of the plates 60 are mounted additional heated rollers 71, these rollers being positioned to apply heat and pressure along the central portion of the sides of the mandrel which are missed by the rollers 64 and 65. That is, the rollers 71 seal the folded-over sections 51 and 61 by applying heat and pressure along the line of thermoplastic adhesive therebetween. Rollers 71 engage the mandrel through openings 72 in the third set of formers 60. Springs 73 engage arms 74 which carry the rollers 71 on one end thereof and bias the latter toward inward position. The opposite end of the arms 74 are pivotally mounted to supports 75, so that the springs 73 may provide the pressure necessary for sealing purposes.

The rollers 64, 65, and 71 have been shown somewhat diagrammatically, it being understood that these rollers are heated to a temperature sufficiently high to produce the necessary seal by conventional means such as electrical resistance coils.

As the mandrels are carried past the heating units the formation of the containers is completed and the hollow mandrels having the containers formed thereabout pass on to the conveyor belts 76 which are mounted as shown in Figs. 1, 2, and 14. The conveyor belts 76 pass over a driven pulley wheel mounted on a shaft 77 and the idler wheels 78 and 79, the wheel 79 being on a lower level whereby to provide an incline down which the mandrels pass in the manner shown in Fig. 2. As the mandrels reach the bottom of the incline they are received by a horizontally-extending platform 80 and are moved into erect position by the action of an arm 81 rigidly mounted on a shaft 82. The shaft 82 also carries an arm 83 having a cam roller 84 on its other end, the latter engaging a cam 85 which is driven in synchronous relation with respect to the conveyor chain 45. The cam 85 has a raised portion 86 which moves the arm 83 outwardly when it engages the roller 84, thereby causing the arm 81 to move the mandrels into erect position.

The mandrels are erected adjacent the spout of a conventional carton-filling device 87. The device may include a hopper filled with the material to be packaged in the containers and a rotating set of measuring cups 88 which empty into the spout to fill the mandrels with a measured quantity of the commodity to be packaged. After being filled in the manner described, the mandrels are moved into engagement with two complementary vertically disposed conveyor belts 89 which carry the mandrels to a place of removal. There the mandrels are slipped out of the containers, and the commodity settles down into the container to form the package indicated at 90. Thereafter the mandrels are returned to the hopper 35 and a suitable enclosure is provided for the container 90.

It will be noted that the mandrels are of greater length than the containers, this permitting the loading of the commodity close to or above the tops of the containers when the mandrels are in place. When the mandrels are removed the commodity settles down to its normal level within the container.

The mechanism described may be driven in any suitable manner. As shown in Figs. 1 and 14, a motor 91 drives a belt 92 about a pulley 93 fixed to a shaft 94, the latter also having a sprocket 95. Sprocket 95 carries a chain 96 which drives sprocket 97 carried on shaft 98. Shaft 98 has a gear 99 which drives an idler gear 100 meshing with gear 101 on shaft 102. Shaft 102 carries sprockets 39 which drive the chains 37. A second sprocket 103 on shaft 102 drives a chain 104 and the latter drives sprocket 105 mounted on shaft 106 of the cutting roll 32.

Shaft 106 has a gear 107 meshing with gear idler 108. Gear 108 drives a gear 109 mounted on shaft 110 of one of the drive rolls 28. The frictional engagement of the two drive rolls causes the web 11 to be drawn downwardly therethrough. In many cases it will be desirable to positively drive the other feed roll 28 by means of a gear 111 on the shaft of the other feed roll meshing with gear 110.

Shaft 98 carries a sprocket 112 which drives the chain 45, the latter also passing about sprocket 113 and a lower sprocket 114. Sprocket 113 is mounted on and drives shaft 77. This shaft carries a second sprocket 115 bearing chain 116 leading to the sprocket 117 on shaft 118. Shaft 118 carries the split cam 19 and thereby actuates the intermittently operated adhesive wheels 15.

Shaft 77 also constitutes the drive for the conveyor belts 76, the belts passing over sprockets 119 thereon.

In operation of the device the draw rolls 28 maintain a traveling web 11 to which is applied spaced marginal lines of a quick-setting thermoplastic adhesive. The web has a sufficiently long path of travel to provide time for cooling or evaporation of solvents whereby the spaced lines of thermoplastic adhesive lose their tackiness. The lines of adhesive are applied to one side only of the web and this side is protected from contact with the rollers until it has set up.

As the web passes through the cutting unit below the draw rolls 28 it presents a curtain which obstructs the path of travel of the mandrels 36 between the rollers 42. The mandrels are intermittently pushed through rollers 42 and the three sets of former elements to fold the container blank in the manner shown in Figs. 6 to 13. The mandrel determines the size of the container and the blank is sufficiently wider than the mandrel to provide bottom, front and rear wall extensions on each side of the mandrel, the extensions being of a width greater than one-half the thickness of the mandrel plus the width of the adhesive lines 21 and 22. Thus, the bottom extensions 52 are folded upwardly alongside the mandrel a distance greater than one-half the width of the mandrel. When the front wall extensions 51 then are folded over against the mandrel and on top of the extensions 52, a continuous adhesive line is presented between extensions 52 and the folded-over portions of extensions 51. Likewise, the adhesive lines along extensions 51 and 52 form in folded-over condition a continuous line for contact with the folded-over extensions 61. As will be seen in Fig. 11, it is preferred that the adhesive lines 21 and 22 extend below the top edge of the blank a distance slightly greater than the length of the front wall plus the width of the bottom section, this length providing an overlapped adhesive line between sections 52 and sections 61. When all of the side extensions are folded over the container is in the condition shown in Fig. 12 with the adhesive lines forming a continuous line of contact therebetween. As shown, this line of contact is of substantially T-shape, the cross portion of the T being spaced upwardly from the bottom of the container. The continuous line of contact provided by the folding method and adhesive lines 21 and 22 insures the formation of a sift-proof bag which has a strong and unobstructed bottom portion.

A particular advantage of the container is that it is quite economical to manufacture and may be employed by the manufacturer of the commodity to be packaged. It is customary at the present time to employ bags for packaging various commodities and the bags are manufactured by a converter and shipped to the user in large quantities. The bags are in flattened condition and their use necessitates an opening operation. Also, the flattened bags have creases which seriously weaken the bag structure when composed of transparent cellulose sheeting. By employing the present invention, the user of containers can manufacture them in any desired quantity as needed, the container-making operation being a part of the filling operation, since the machine delivers an open container having a mandrel through which the container may be filled without requiring a separate operation.

In most instances it will be desirable to employ printed transparent cellulose sheeting, and where the printed material is employed the operation of the mechanism for applying the lines of thermoplastic adhesive and for cutting the web into blanks will be synchronized with the printed design of the web.

The thermoplastic adhesive employed may vary in its formula. It should be of such a nature as to set up rapidly after application and should be sufficiently flexible after the sealing operation as to provide a non-brittle union.

Gum mastic combined with methyl acetone forms a basis for a satisfactory thermoplastic adhesive. Another adhesive is as follows:

| | |
|---|---|
| W. W. rosin | grams__ 60 |
| Abalyn | do____ 32 |
| Rezinol, No. 2 | do____ 20.25 |
| Diamyl phthalate | oz. (vol.)__ 5/16 |
| Ethyl cellulose | grams__ 3.70 |

The adhesive is sufficiently hard to set immediately after application, but has the property of maintaining flexibility subsequent to the sealing operation.

The folding operation may be varied by initially folding the extensions 51 of the front wall downwardly against the side of the mandrel and then folding the extensions 52 on the bottom section in overlapped relation with respect to the sections 51 and 52. In this method of folding there still is a continuous glue line between all of the folded-over portions, but the method of folding is not as well adapted to the stationary type of formers as is the method illustrated in the drawings.

After formation of the container about the mandrel, it is desirable in many cases where a duplex bag is needed, to return the mandrels with the containers formed thereon back to the hopper 35, whereupon the mandrels again are pushed through the machine and a second container is formed about the first container in the manner described. The inner container is filled through the hollow mandrel and the mandrel then is removed from the containers, the frictional engagement of the two containers being sufficient to insure their being held together to produce a structure which is quite strong.

In preparing a web of material to be formed into containers having printed matter on the front and rear walls, the web initially is printed with the design which is to appear on the front wall in upright position and the design which is to appear on the rear wall is printed in upside-down position. The designs for the front and rear faces of the container are printed by different parts of the printing unit or cylinder, even though the designs are to appear the same after formation of the container. The printed web, then, consists of a series of reversely positioned designs. The lines of thermoplastic adhesive 21 and 22 are applied along the marginal edges of the web adjacent the designs positioned in one direction. The web is severed so as to form container blanks having oppositely positioned designs thereon, as shown in Fig. 9. The blank is folded about the mandrel in the manner described, and when the side sections are sealed both of the printed designs are in upright position.

Where it is desired to provide a lip or top extension on the container, the mandrel may be projected against the blank in an off-center manner so that the wall to which no adhesive is applied is longer than the wall to which the adhesive is applied. In the finished container the former wall will extend upwardly beyond the wall to which the glue lines initially were applied. The upwardly folded flap may be utilized for the purpose of gaining ready access to the interior of the bag or for closure purposes.

It will be recognized that the invention as described herein for purposes of illustration and description may be changed without departing from the scope of the invention and all such changes and modifications are intended to be included in the appended claims.

I claim:

1. A container-forming machine, comprising means for applying limited lines of a quick-setting thermoplastic adhesive along the edges of a web of container material, means for severing container blanks from said web, means for folding said blanks about a mandrel to form continuous front, bottom and rear walls, means spaced from said adhesive-applying means sufficiently to permit said lines of adhesive to set up for folding the edges of said walls in overlapped relation against the sides of said mandrel to form side walls having contacting lines of thermoplastic adhesive of substantially T-shape, means for momentarily applying heat and pressure to the cross portions of said lines of adhesive, and means for applying heat and pressure along the remainder of said adhesive lines.

2. The method of producing containers of the type described, which comprises printing a web of container material with a series of alternating reversely-positioned designs, applying marginal lines of a thermoplastic adhesive along the blank adjacent one set of the designs, severing the web in container units, each having oppositely positioned designs, folding the container blank about a mandrel after said lines of thermoplastic adhesive have set up to form continuous front, bottom and rear walls with said reversely positioned designs respectively appearing on the front and rear walls in upright position, folding extensions on said walls over with said glue lines forming contacts therebetween, and sealing said container by the application of heat and pressure along said lines of adhesive.

3. The method of producing containers of the type described, which comprises advancing a web of container material, applying spaced marginal lines of a thermoplastic adhesive to opposite edges of said web, setting said lines of adhesive during progress of said web, cutting the web transversely adjacent the one end of said lines of adhesive to form a blank, folding said blank about a mandrel to form continuous front, bottom and rear walls each having extensions, folding said extensions against the sides of said mandrel with said adhesive lines forming contacts of substantially T-shape between said extensions, and applying heat and pressure to said extensions to form a seal with said thermoplastic adhesive.

4. The method of producing containers of the type described, which comprises unwinding a web from a roll of transparent cellulose sheeting having spaced designs printed thereon, imparting continuous movement to said web, applying interrupted marginal lines of a quick-setting thermoplastic adhesive to opposite edges of said web on the outside thereof in predetermined position with respect to said printed designs, setting said adhesive into substantially non-tacky condition, thereafter severing the web into container blanks adjacent the termination of said lines of adhesive, folding said blanks about mandrels with said lines of adhesive on the outside thereof to form continuous front, bottom and rear walls with marginal extensions, the bottom extensions and the extensions of another of said walls carrying said lines of thermoplastic adhesive, folding said extensions against the sides of said mandrels after said lines of adhesive have set up with said adhesive lines forming contacts between said extensions, and thereafter applying heat and pressure to the folded extensions to effect a bond between said extensions and said thermoplastic adhesive.

5. The method of producing containers of the type described, which comprises applying interrupted lines of a quick-setting thermoplastic adhesive adjacent opposite edges of the outside of a web of container material, said lines of adhesive being of substantially the same length and in transverse alignment, cutting said web adjacent one end of said lines of adhesive to form a container blank, folding said blank to form continuous front and rear walls and bottom, said adhesive lines being on the outside of the folded blank and extending along said bottom and one of said walls, folding the edges of said bottom and said walls into overlapped relation with said adhesive lines forming contacts of substantially T-shape between said overlapped edges, and applying heat and pressure along said adhesive lines.

6. The method of producing containers of the type described, which comprises applying interrupted lines of a thermoplastic adhesive to the edges of the outside of a container blank, partially folding said blank to form continuous front and rear walls and a bottom with said lines of adhesive on the outside and extending along the bottom and one of said walls, folding the edges of said bottom and said sides after said lines of adhesive have set up into overlapped relation with said lines of adhesive forming transverse and longitudinal lines of contact between the overlapped edges, and heat-sealing said overlapped edges.

7. A device for forming containers of the type described, comprising draw rolls for progressing a web of container material, means of less width than said web for applying interrupted lines of a quick-setting thermoplastic adhesive adjacent the edges of the outside of said web, means for cutting said web adjacent the ends of said lines of adhesive to form a blank, means for progressing a mandrel in advance of said draw rolls and for folding said blank about said mandrel to form continuous front and rear walls and a bottom with said adhesive lines on the outside and extending along said bottom and one of said walls, formers in the path of travel of said mandrel for contacting the edges of said bottom and walls including said adhesive lines and for folding said edges in overlapped relation against the sides of said mandrel with said adhesive lines forming substantially continuous contacts therebetween, said formers being spaced from said means for applying said lines of thermoplastic adhesive sufficiently to permit said lines of adhesive to set up before contact with said formers, and means for applying heat and pressure to said overlapped edges to reset said lines of thermoplastic adhesive.

8. A device for forming containers of the type described, comprising means for applying interrupted lines of a quick-setting thermoplastic adhesive to the edges of the outside of a container blank, means for progressing a mandrel of less width than said blank and for partially folding said blank thereabout to form continuous front and rear walls and a bottom with said lines of adhesive being on the outside of said blank with respect to said mandrel and extending along said bottom and one of said walls, formers in the path of travel of said mandrel contacting the edges of said bottom and walls including said glue lines for folding said edges in overlapped relation against the sides of said mandrel with said glue lines forming contacts of substantially T-shape between said overlapped edges, said formers being positioned after said adhesive-applying means sufficiently to permit said lines of adhesive to set up prior to contact therewith, and means for applying heat and pressure to said overlapped edges.

PAUL M. GILFILLAN.